United States Patent
Houser et al.

(10) Patent No.: US 8,097,150 B1
(45) Date of Patent: Jan. 17, 2012

(54) WAVE ENERGY CONVERSION SYSTEM

(76) Inventors: Dwight Francis Houser, Medford, OR (US); Dwight F. Houser, II, Arvada, CO (US); Mattew J. Houser, Dana Point, CA (US)

( * ) Notice: Subject to any disclaimer, the term of this patent is extended or adjusted under 35 U.S.C. 154(b) by 536 days.

(21) Appl. No.: 12/316,392

(22) Filed: Dec. 12, 2008

(51) Int. Cl.
*B01D 35/153* (2006.01)
*F04B 17/00* (2006.01)
*B63B 35/00* (2006.01)

(52) U.S. Cl. .......... 210/136; 60/497; 114/265; 114/266; 114/267; 210/170.11; 210/242.1; 210/321.66; 210/459; 290/42; 290/53; 417/61; 417/330; 417/331

(58) Field of Classification Search ............... 60/325, 60/495–502, 505; 210/136, 170.11, 242.1, 210/321.66, 322, 459, 460; 417/61, 313, 417/330–333; 114/121, 123, 256, 264–267; 290/42, 53
See application file for complete search history.

(56) References Cited

U.S. PATENT DOCUMENTS

| | | | |
|---|---|---|---|
| 51,148 A | 11/1865 | Collins | |
| 755,072 A | 3/1904 | Stouffer | |
| 899,652 A | 9/1908 | Bentley et al. | |
| 1,377,163 A | 5/1921 | Pool | |
| 4,091,618 A | 5/1978 | Jackson | |
| 4,196,591 A * | 4/1980 | Wallace | 60/497 |
| 4,586,333 A | 5/1986 | Reid | |
| 5,411,377 A | 5/1995 | Houser et al. | |
| 6,388,342 B1 * | 5/2002 | Vetterick et al. | 290/53 |
| 6,791,206 B1 * | 9/2004 | Woodbridge | 290/53 |
| 7,755,211 B2 * | 7/2010 | Montgomery | 290/53 |
| 2005/0236840 A1 * | 10/2005 | Stark et al. | 290/53 |

* cited by examiner

*Primary Examiner* — Joseph Drodge
(74) *Attorney, Agent, or Firm* — Jerry Haynes Law

(57) ABSTRACT

A wave energy conversion system includes a barge support frame having a frame superstructure and a plurality of frame support legs selectively extendable from the frame superstructure, a barge carried by the barge support frame and at least one wave energy conversion pump comprising a water transfer conduit carried by the barge support frame and having a filter port and an inner water transfer space disposed in fluid communication with the filter port, a pressure conduit mounted for displacement on the water transfer conduit and having an outer water transfer space disposed in fluid communication with the inner water transfer space and a buoyancy vessel carried by the pressure conduit. Also disclosed are a power generation pumping system and a river or stream fed system having tanks to contain and pressurize water to a force sufficient to drive turbine generators for electric power production and potable water use.

7 Claims, 7 Drawing Sheets

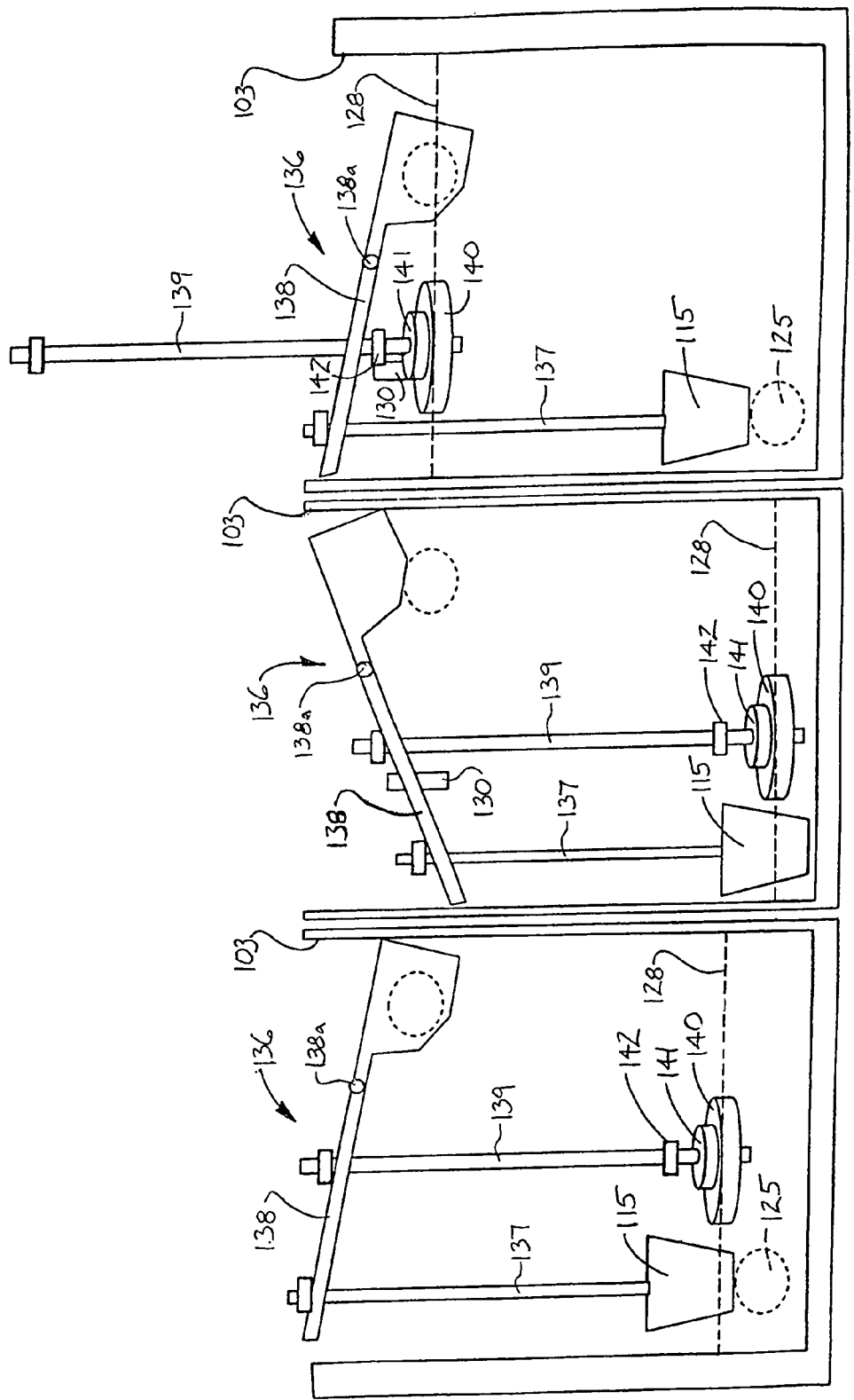

WAVE ENERGY CONVERSION SYSTEM

TECHNICAL FIELD

The present disclosure relates to energy conversion systems. More particularly, the present disclosure relates to a wave energy conversion system which converts wave energy into pumping energy and includes an improved sleeve-type conversion pump design.

BACKGROUND

New sources of energy for producing power are needed for a variety of applications. There is also a need for environmentally-safe, renewable energy sources which can be used to supply the ever-increasing need for potable water, electrical power and automotive and other sources of energy. One type of energy which is environmentally-safe and renewable is the wave motion of the ocean.

A variety of systems have been proposed for using wave motion as a source of energy. Most of these systems utilize closed loop hydraulic systems, cable movements, rack and pinion gearing devices, air pumps and bellows to enhance and convert wave energy. These systems may not utilize any specifically-designed ballast mass as a driving force but rather, may be generally dependent upon the buoyancy of flotation elements and the tidal rise and fall of the ocean as their prime mover.

An improved wave energy conversion system is needed in which each of multiple wave energy conversion pumps in the system utilizes tidal movements of sea water in conjunction with a ballast mast to reciprocate a flotation element in the sea water and includes a central pump support shaft in which no water movement occurs. This eliminates the need for water inlet and outlet ports which could otherwise weaken the pump support shaft.

SUMMARY

The present disclosure is generally directed to a wave energy conversion system. An illustrative embodiment of the wave energy conversion system includes a barge support frame having a frame superstructure and a plurality of frame support legs selectively extendable from the frame superstructure, a barge carried by the barge support frame and at least one wave energy conversion pump comprising a water transfer conduit carried by the barge support frame and having a filter port and an inner water transfer space disposed in fluid communication with the filter port, a pressure conduit mounted for displacement on the water transfer conduit and having an outer water transfer space disposed in fluid communication with the inner water transfer space and a buoyancy vessel carried by the pressure conduit.

The present disclosure is further generally directed to a power generation pumping system. An illustrative embodiment of the power generation pumping system includes at least one water-receiving vault; at least one pumping chamber disposed in fluid communication with the at least one water-receiving vault; a pressure conduit extending through and disposed in fluid communication with the at least one pumping chamber, respectively; a pump buoyancy ring mounted for displacement on the pressure conduit; a pump pressure cylinder carried by the pump buoyancy ring and disposed in fluid communication with the pressure conduit; a water turbine disposed in fluid communication with the pressure conduit; and an electrical generator drivingly engaged by the water turbine.

BRIEF DESCRIPTION OF THE DRAWINGS

The disclosure will now be made, by way of example, with reference to the accompanying drawings, in which:

FIGS. 8-10 are schematic diagrams which illustrate sequential operation of the gate valve in each gate valve assembly;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention which is defined by the claims. Furthermore, there is no intention to be bound by any expressed or implied theory presented in the preceding technical field, background, brief summary or the following detailed description.

Figure 1:
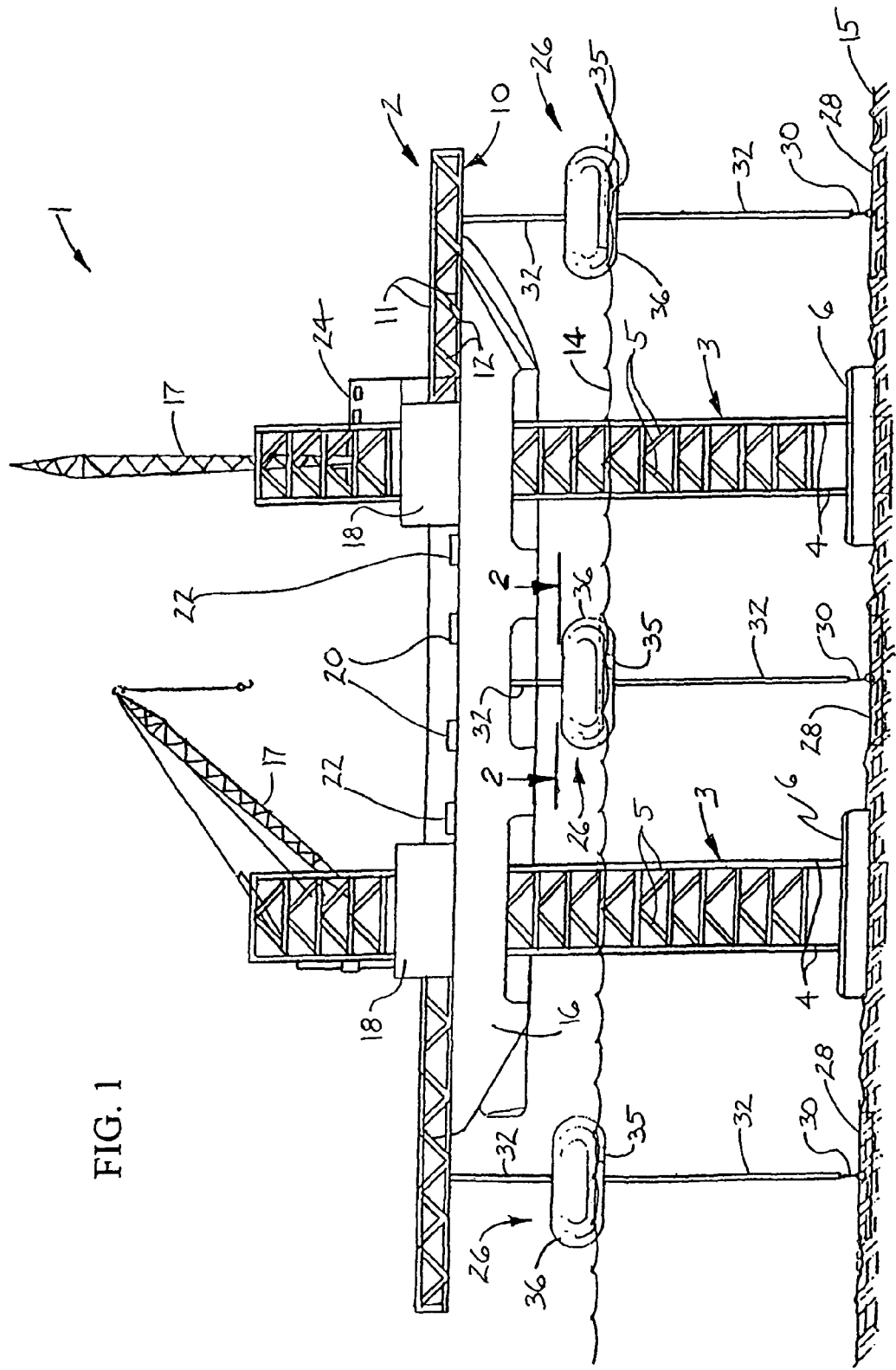
FIG. 1 is a side view of an illustrative embodiment of the wave energy conversion system, in implementation on a water body such as a sea.
Figure 3:
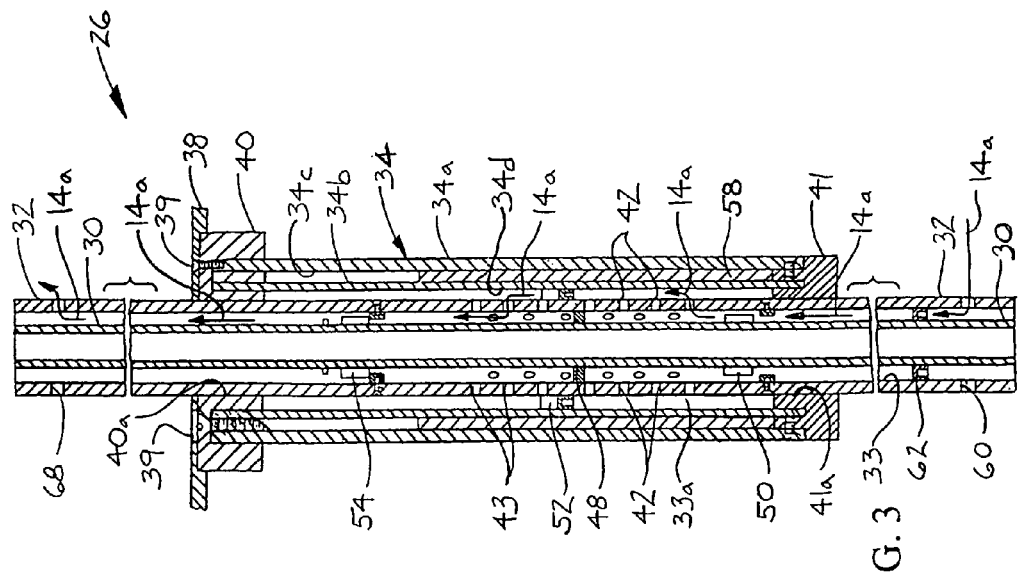
FIG. 3 is a sectional view, taken along section lines 3-3 in FIG. 2, of a wave energy conversion pump.
Figure 2:
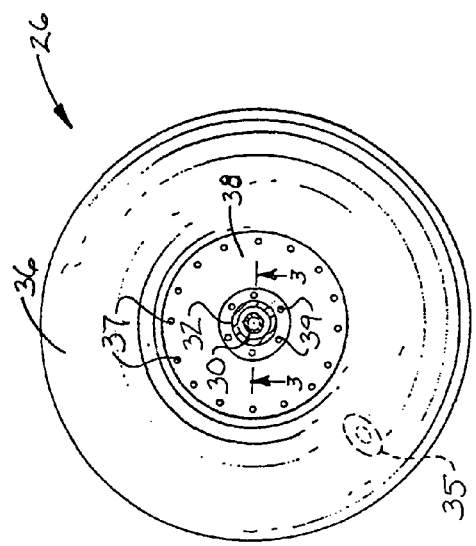
FIG. 2 is a bottom view of a buoyancy vessel element of a wave energy conversion pump of an illustrative embodiment of the wave energy conversion system.

Referring initially to FIGS. 1-3 of the drawings, an illustrative embodiment of a wave energy conversion system is generally indicated by reference numeral 1 in FIG. 1. The wave energy conversion system 1 is an improvement in the wave energy conversion disclosed in U.S. Pat. No. 5,411,377, which is hereby incorporated by reference herein in its entirety. As illustrated in FIG. 1, the wave energy conversion system 1 includes a barge support frame 2 which is adapted to support a barge 16 above a water body 14 such as a sea or ocean, for example and without limitation, after navigation of the barge 16 to a selected location on the water body 14. The barge support frame 2 may include multiple frame support legs 3 (two of which is shown in FIG. 1). Each frame support leg 3 may include a footing 6 which is adapted to rest on the water body floor 15 of the water body 14. Each frame support leg 3 may further include multiple vertical support members 4 which extend upwardly from the corresponding footing 6. Reinforcing members 5 may extend between the vertical support members 4 in any suitable pattern for reinforcement purposes.

A frame superstructure 10 is supported by the frame support legs 3. The frame superstructure 10 may include multiple horizontal support members 11 and reinforcing members 12 which connect the horizontal support members 11. The barge 16 is supported by the frame superstructure 10. The frame support legs 3 of the barge support frame 2 extend through respective leg drive units 18 provided on the frame superstructure 10 and the barge 16. The leg drive units 18 are operable to selectively extend and retract the frame support legs 3 downwardly and upwardly, respectively, through the frame superstructure 10 and the barge 16, according to the knowledge of those skilled in the art. Retraction of the frame support legs 3 upwardly through the frame superstructure 10 and the barge 16 by operation of the respective leg drive units 18 facilitates floating of the barge 16 and the barge support frame 10 on the water body 14. This facilitates navigation of the wave energy conversion system 1 to any desired location on the water body 1 for use. Conversely, extension of the frame support legs 3 downwardly through the frame superstructure 10 and the barge 16 by operation of the respective leg drive units 18 facilitates placement of the footings 6 on the water body floor 15 of the water body 14. Continued downward extension of the frame support legs 3 facilitates upward travel of the barge 16 and the frame superstructure 10 on the frame support legs 3 and elevation of the barge 16 and the frame superstructure 10 above the surface of the water body 14.

A control unit 24 may be provided on the barge 16 to house the operational controls of the wave energy conversion system 1. In some embodiments, a derrick 17 may be provided on one or each of the frame support legs 3 for hoisting purposes. The barge 16 may be equipped with water filters 20 and reverse osmosis machinery 22 for the purpose of purifying and rendering potable water pumped from the water body 14, as will be hereinafter described.

At least one wave energy conversion pump 26 extends from the frame superstructure 10 of the barge support frame 2. In some embodiments, the system 1 includes multiple wave energy conversion pumps 26. Each wave energy conversion pump 26 includes a water transfer conduit 32 which extends from the frame superstructure 10. The water transfer conduit 32 may be attached to the frame superstructure 10 according to any suitable technique which is known by those skilled in the art. As illustrated in FIG. 1, a pump base 28 is provided on a lower end of the transfer conduit 32.

As illustrated in FIG. 3, a central pump support shaft 30 extends through the water transfer conduit 32. An inner water transfer space 33 is defined between the central pump support shaft 30 and the water transfer conduit 32. A water stop 48 may be provided in the inner water transfer space 33a between the interior surface of the water transfer conduit 32 and the exterior surface of the central pump support shaft 30 for stopping water movement on the low pressure side. As illustrated in FIG. 1, a pump base 28 may be provided on a lower end of the central pump support shaft 30 of each wave energy conversion pump 26.

As illustrated in FIG. 3, the water transfer conduit 32 slidably extends through a pressure conduit 34. The pressure conduit 34 includes an upper bearing 40 having an upper bearing opening 40a which receives the water transfer conduit 32. The pressure conduit 34 further includes a lower bearing 41 having a lower bearing opening 41a which receives the water transfer conduit 32. A generally elongated, cylindrical outer barrel 34a extends between and sealingly engages the upper bearing 40 and the lower bearing 41. A generally elongated, cylindrical inner barrel 34b also extends between and sealingly engages the upper bearing 40 and the lower bearing 41, inside the outer barrel 34a. An annular ballast space 34c is defined between outer barrel 34a and the inner barrel 34b. An outer water transfer space 34d is defined between the inner barrel 34b of the pressure conduit 34 and the water transfer conduit 32. Ballast 58 is provided in at least the lower or bottom portion of the ballast space 34c. The ballast 58 may be lead or concrete, for example and without limitation.

As further illustrated in FIG. 3, at least one filter port 60 is provided in the water transfer conduit 32 and communicates with the inner water transfer space 33. A check valve 62 is provided in the inner water transfer space 33 in spaced-apart relationship with respect to the filter port 60. A check valve 50 is provided in the inner water transfer space 33 in spaced-apart relationship with respect to the check valve 62. Multiple, spaced-apart transfer conduit inlet ports 42 are provided in the water transfer conduit 32 above the check valve 50 and beneath the water stop 48. Multiple, spaced-apart transfer conduit outlet ports 43 are provided in the water transfer conduit 32 above the water stop 48. The transfer conduit inlet ports 42 on the low pressure side and the transfer conduit outlet ports 43 on the high pressure side establish fluid communication between the inner water transfer space 33 and the outer water transfer space 34d. A check valve 52 is provided in the outer water transfer space 34d, between the transfer conduit inlet ports 42 and the transfer conduit outlet ports 43. A check valve 54 may be provided in the inner water transfer space 33 above the transfer conduit outlet ports 43. At least one upper outlet port 68 is provided in the upper end portion of the water transfer conduit 32 and communicates with the inner water transfer space 33. The upper outlet port or ports 68 may be disposed in fluid communication with the water filters 20 (FIG. 1) and reverse osmosis machinery 22 provided on the barge 16 of the wave energy conversion system 1.

A support plate 38 is attached to the upper bearing 40 such as via support plate fasteners 39. A buoyancy vessel 36, which may be toroidal, is attached to the support plate 38 such as via vessel fasteners 37 (FIG. 2). The buoyancy vessel 36 may be any suitable buoyant material. A solenoid valve 35 may be provided in the buoyancy vessel 36 to allow the entry and exit of water (not illustrated) into and out of, respectively, the buoyancy vessel 36 stopping pumping activity during storm waves for example.

In typical operation of the wave energy conversion system 1, the frame support legs 3 of the barge support frame 2 are disposed in a raised position on the barge 16 by operation of the respective leg drive units 18 (FIG. 1). The barge 16 floats on the water body 14 and is navigated to a location on the water body 14 where potable water or electrical power is needed. Next, the leg drive units 18 are operated to lower the respective frame support legs 3 of the barge support frame 2 until the pump base 28 of each frame support leg 3 rests on the water body floor 15 of the water body 14, as illustrated in FIG. 1. The water transfer conduit 32 is extended downwardly through the pressure conduit 34 of each wave energy conversion pump 26 until the pump base 28 rests on the water body floor 15.

As the buoyancy vessel 36 floats on the water body 14 and rises and falls with the crests and troughs throughout the tidal action of the water body 14, the pressure conduit 34 reciprocates on the water transfer conduit 32. The ballast 58 (FIG. 3) in the ballast space 34c pressurizes water to a force required by osmosis filtration. This reciprocating action of the pressure conduit 34 on the water transfer conduit 32 draws water 14a through the filter port or ports 60 and into the inner water transfer space 33. On its upstroke, the water 14a flows upwardly through the inner water transfer space 33 by vacuum action and sea pressure and through the check valves 62 and 50, respectively. The water 14a then flows from the inner water transfer space 33, through one of the transfer conduit inlet ports 42 and into the outer water transfer space 42. As it flows upwardly through the outer water transfer space 34d, the water 14a flows to water stop 48 and through the check valve 52. The water 14a is then pressurized on the down stroke, closing check valve 52 and then flows from the outer water transfer space 33a, through the transfer conduit outlet ports 43 and back into the inner water transfer space 34d. The water 14a flows upwardly through the inner water transfer space 33, through the check valve 54 and finally, exits the inner water transfer space 33 through the upper outlet port or ports 68. The water 14a may then be distributed to the water filters 20 (FIG. 1) and reverse osmosis machinery 22 on the barge 16, where the water 14a is purified and rendered potable. The purified potable water 14a can then be used for drinking and/or other purposes. Furthermore, in some applications, the by-pass water from the osmosis filter is conducted through turbine generators producing electricity which may be used to separate hydrogen gas generated from the brine solution which remains as a by-product from the water filtration process via hydrolysis, with the brine solution acting as an electrolyte.

Figure 4:
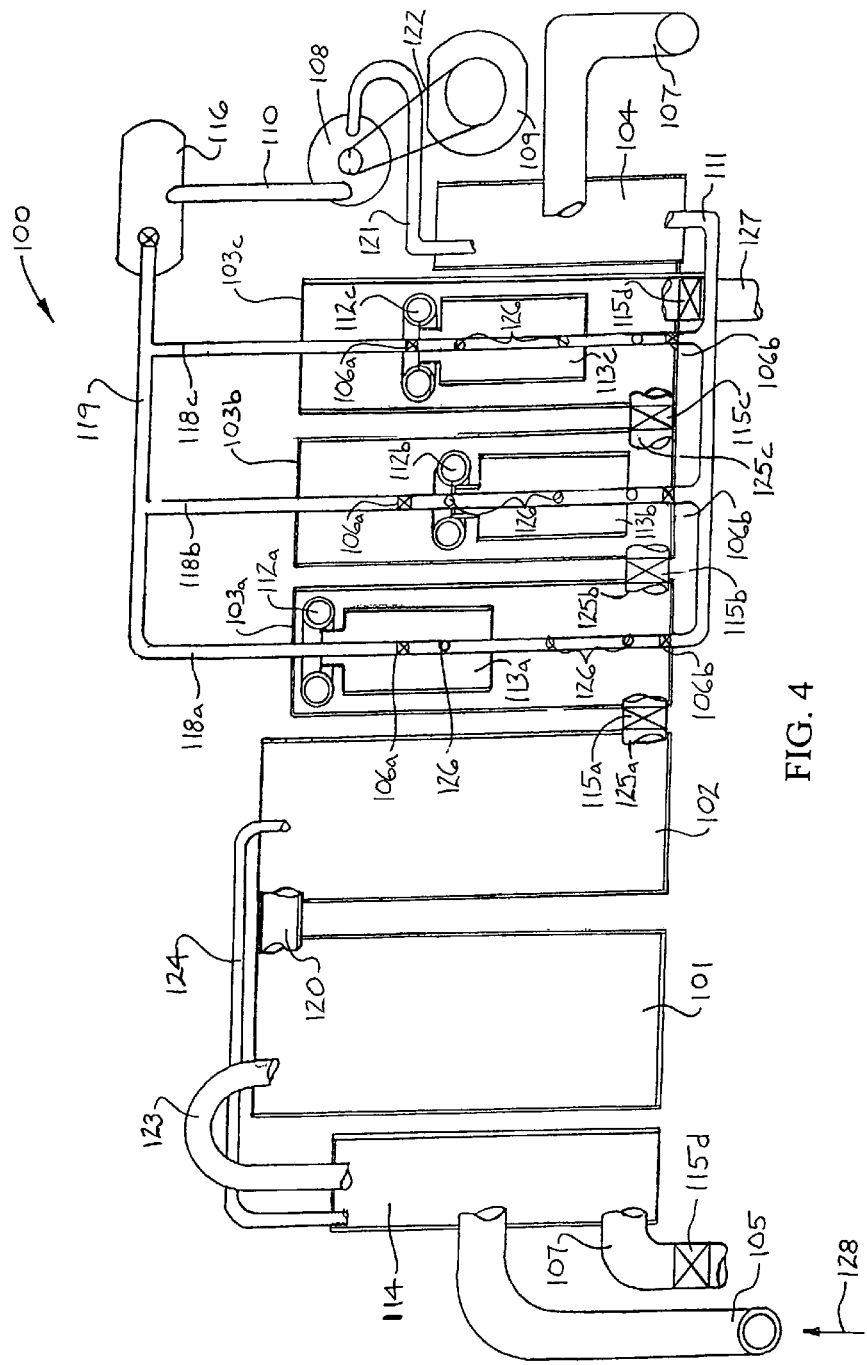
FIG. 4 is a schematic diagram of an illustrative embodiment of a power generation pumping station.
Figure 7:
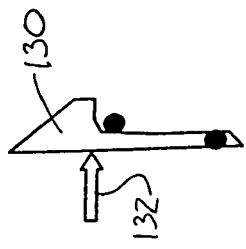
FIG. 7 is a side view of an illustrative latch mechanism which is suitable for implementation in a gate valve assembly of an illustrative embodiment of the power generation pumping station.

Referring next to FIG. 4 of the drawings, an illustrative embodiment of a power generation pumping system, hereinafter pumping system, is generally indicated by reference numeral 100 in FIG. 4. The pumping system 100 includes a pre-filter tank 114 which receives a supply of water 128 from a source (not illustrated) such as through an upstream water inlet conduit 105, for example. The source which supplies the supply of water 128 may be a stream, river, irrigation spillway, city water tower or any other supply of water 128 having sufficient volume to power a turbine 108 (FIG. 4), for electrical power and filtration in tank 104 for potable water, as will be hereinafter described. A water settling vault 101 is disposed in fluid communication with the pre-filter tank 114 such as through a transfer conduit 123. A water storage vault 102 is disposed in fluid communication with the water settling vault 101 such as through a connecting conduit 120. An overflow conduit 124 may connect the water storage vault 102 to the pre-filter tank 114.

At least one pumping chamber 103 is disposed in fluid communication with the water storage vault 102. Preferably, pumping stations 103a, 103b, and 103c are positioned such that water would pumping station 103a first and then when station 103a is filled then station 103b would be filled next and then station 103c would be filled in sequence after station 103b is filled. In some embodiments, a first pumping chamber 103a is disposed in fluid communication with the water storage vault 102 through a transfer conduit 125a fitted with a first gate valve 115a; a second pumping chamber 103b is disposed in fluid communication with the first pumping chamber 103a through a transfer conduit 125b fitted with a second gate valve 115b; and a third pumping chamber 103c is disposed in fluid communication with the second pumping chamber 103b through a transfer conduit 125c fitted with a third gate valve 115c. A pressure conduit 118 extends generally vertically through each pumping chamber 103. In the pumping station 100, a first pressure conduit 118a extends through the first pumping chamber 103a; a second pressure conduit 118b extends through the second pumping chamber 103b; and a third pressure conduit 118c extends through the third pumping chamber 103c. Pump pressure cylinders 113a-113c are mounted for vertical displacement on the respective pressure conduits 118a-118c inside the respective pumping chambers 103a-103c. Pump buoyancy rings 112a-112c are provided on the respective pump pressure cylinders 113a-113c to impart buoyancy to the pump pressure cylinders 113. Each pressure conduit 118 is disposed in fluid communication with the interior of the corresponding pumping chamber 103 and with the interior of the corresponding pump pressure cylinder 113 through multiple, spaced-apart conduit openings 126 provided in the pressure conduit 118. An upper check valve 106a may be provided in each pressure conduit 118 above the conduit openings 126. A lower check valve 106b may be provided in each pressure conduit 118 below the conduit openings 126. A drain conduit 127, which may be fitted with a gate valve 115d, is disposed in fluid communication with the third pumping chamber 103c. The drain conduit 127 may discharge into the water source (not illustrated) from which the drain water 128 is obtained. Additional pumping chambers 103 may be added to the pumping system 1 depending on the volume of water 128 which flows into the pumping system 1.

A distribution conduit 119 is disposed in fluid communication with each pressure conduit 118. A high-pressure water accumulator 116 may be disposed in fluid communication with the distribution conduit 119. A water turbine 108 is disposed in fluid communication with the high-pressure water accumulator 116 such as through a turbine inlet conduit 110. The water turbine 108 drivingly engages an electrical generator 109 such as through a turbine drive belt 122. A filtered water recirculation tank 104 is disposed in fluid communication with the water turbine 108 such as through a turbine connecting conduit 121. Filter of water in tank 104 may be such as to render the fresh water potable.

A drain return conduit 111 may be disposed in fluid communication with the lower check valves 106b of the respective pressure conduits 118. The filtered water recirculation tank 104 is disposed in fluid communication with the drain return conduit 111. A water return conduit 107 may connect the filtered water recirculation tank 104 to the pre-filter tank 114 or to a bottling plant (not shown) for distribution.

In typical operation of the pumping system 100, the supply of pressurized water 128 flows from the water source (not illustrated) such as a stream, river, irrigation spillway, city water tower, for example and without limitation; through the upstream water inlet conduit 105 and into the pre-filter tank 114, respectively. The water rises in the pre-filter tank 114 and eventually flows into the water settling vault 101 through the transfer conduit 123. The water eventually flows into the water storage vault 102 through the connecting conduit 120.

The gate valve 115a is opened to facilitate flow of water from the water storage vault 102, through the transfer conduit 125a and into the first pumping chamber 103a. As the water rises in the first pumping chamber 103a, the buoyant pump buoyancy ring 112a lifts the pump pressure cylinder 113a on the pressure conduit 118a. This rising action of the pump pressure cylinder 113a on the pressure conduit 118a draws water from the first pumping chamber 103a, through the conduit openings 126 and pressure conduit 118a and into the pump pressure cylinder 113a, respectively.

When the buoyancy ring 112a reaches the uppermost position in the first pumping chamber 103a, the gate valve 115a is closed to prevent further flow of water from the water storage vault 102 and into the first pumping chamber 103a. The gate valve 115b is then opened to facilitate flow of water from the first pumping chamber 103a, through the transfer conduit 125b and into the second pumping chamber 103b, respectively. Simultaneously, the water in the first pumping chamber 103a falls such that the pump buoyancy ring 112a and the pump pressure cylinder 113a fall on the pressure conduit 118a. This falling action of the pump pressure cylinder and ballast 113a pressurizes the water which is contained therein and forces the water into the pressure conduit 118a through the conduit openings 126. The pressurized water flows through the check valve 106a in the pressure conduit 118a and through the distribution conduit 119 to the high-pressure water accumulator 116. Water which does not flow from the pressure conduit 118a to the distribution conduit 119 falls through the check valve 106b and is distributed to the filtered water recirculation tank 104 through the drain return conduit 111.

As it continues to flow from the first pumping chamber 103a into the second pumping chamber 103b, the water rises in the second pumping chamber 103b and lifts the buoyant pump buoyancy ring 112b, which in turn lifts the pump pressure cylinder 113b on the pressure conduit 118b. Water is drawn from the second pumping chamber 103b, through the conduit openings 126 and pressure conduit 118b and into the pump pressure cylinder 113b, respectively. When the buoyancy ring 112b reaches the uppermost position in the second pumping chamber 103b, the gate valve 115b is closed to prevent further flow of water from the first pumping chamber 103a and into the second pumping chamber 103b. The gate valve 115c is then opened to facilitate flow of water from the second pumping chamber 103b, through the transfer conduit 125c and into the third pumping chamber 103c, respectively. Simultaneously, the water in the second pumping chamber 103b falls such that the pump buoyancy ring 112b and the pump pressure cylinder and ballast 113b fall on the pressure conduit 118b. Consequently, water which is contained in the second pumping chamber 103b is pressurized and forced into the pressure conduit 118b through the conduit openings 126. The pressurized water flows through the check valve 106a in the pressure conduit 118b and through the distribution conduit 119 to the high-pressure water accumulator 116. Water which does not flow from the pressure conduit 118b to the distribution conduit 119 falls through the check valve 106b and is distributed to the filtered water recirculation tank 104 through the drain return conduit 111.

The water continues to flow from the second pumping chamber 103b into the second pumping chamber 103c until the rising water lifts the buoyant pump buoyancy ring 112c and the pump buoyancy ring 112c lifts the pump pressure cylinder 113c on the pressure conduit 118c. Water is drawn from the third pumping chamber 103c, through the conduit openings 126 and pressure conduit 118c and into the pump pressure cylinder 113c, respectively. When the buoyancy ring 112c reaches the uppermost position in the second pumping chamber 103c, the gate valve 115c is closed to prevent further flow of water from the second pumping chamber 103b and into the third pumping chamber 103c. The water may be drained from the third pumping chamber 103c through the open gate valve 115d and the drain conduit 127, which may discharge the water into the water source (not illustrated) from which the water 128 is obtained. Simultaneously, the water in the third pumping chamber 103c falls such that the pump buoyancy ring 112c and the pump pressure cylinder 113c fall on the pressure conduit 118c. Therefore, water in the third pumping chamber 103c is pressurized and forced into the pressure conduit 118c through the conduit openings 126. The pressurized water flows through the check valve 106a in the pressure conduit 118c and through the distribution conduit 119 to the high-pressure water accumulator 116. Water which does not flow from the pressure conduit 118c to the distribution conduit 119 falls through the check valve 106b and is distributed to the filtered water recirculation tank 104 through the drain return conduit 111.

The high-pressure water accumulator 116 receives the pressurized water from the distribution conduit 119, which receives pressurized water from the first pump pressure cylinder 113a; the second pump pressure cylinder 113b; and the third pump pressure cylinder 113c, respectively, as was heretofore described. The pressurized water flows from the high-pressure water accumulator 116, through the turbine inlet conduit 110 and into the water turbine 108, respectively, and drives the water turbine 108. In turn, the water turbine 108 drives the electrical generator 109 via the turbine drive belt 122. Therefore, the electrical generator 109 generates electrical power which can be used in any of a variety of applications. The high-pressure water accumulator 116 acts as a surge protector for the water turbine 108 as the high-pressure water drives the water turbine 108. The water flows from the water turbine 108 and into the filtered water recirculation tank 104 through the turbine connecting conduit 121. Water which flows into the filtered water recirculation tank 104 from the drain return conduit 111 and the turbine connecting conduit 121 may flow back to the pre-filter tank 114 through the water return conduit 107.

The source water 128 may continue to flow into the water settling vault 101 and the water storage vault 102 depending on the volume and head pressure of the source water 128. In the event that the water in the water settling vault 101 and/or the water storage vault 102 overflows, the water flows through the transfer conduit 123 and/or the overflow conduit 124; in the reverse direction through the pre-filter tank 114; and through the water return conduit 107, the gate valve 115d and the filtered water recirculation tank 104 and the third pumping chamber 103c, the second pumping chamber 103b and the first pumping chamber 103a, respectively, backwashing the pre-filter tank 114 and the pumping chambers 103.

Figure 6:
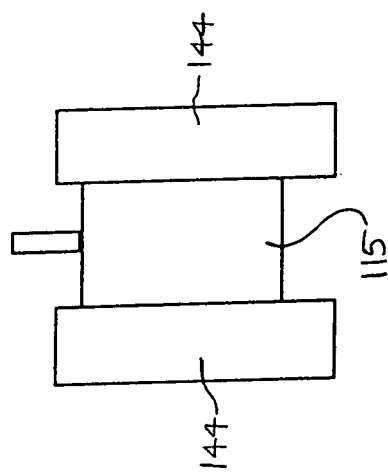
FIG. 6 is a front view of the gate valve.
Figure 5:
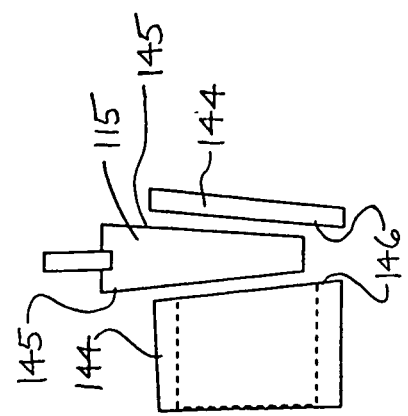
FIG. 5 is a side view of a gate valve element of an illustrative embodiment of the power generation pumping station.

Referring next to FIGS. 5-10 of the drawings, each gate valve 115 of the pumping system 100 (FIG. 4) may be part of a gate valve assembly 136 which is illustrated in various stages of operation FIGS. 8-10, respectively. As illustrated in FIGS. 8-10, each gate valve assembly 136 includes a generally elongated valve arm 138 which is pivotally mounted in each pumping chamber 103 via a pivot point 138a. An elongated valve rod 137 extends downwardly from a distal or extending end of the valve arm 138. A gate valve 115 is provided on the valve rod 137. As illustrated in FIG. 5, the gate valve 115 may have a generally wedge-shaped configuration when viewed from the side and has a pair of angled valve surfaces 145. The valve surfaces 145 are adapted to sealingly engage complementary valve seat surfaces 146 of a valve seat 144 which is provided in the corresponding transfer conduit 125 when the gate valve 115 is closed (as illustrated in FIG. 6) and disengage the valve seat surfaces 146 when the gate valve 115 is open. In some embodiments, the valve seat surfaces 146 of the valve seat 144 may be polytetrafluoroethylene (TEFLON) (trademark). An elongated float rod 139 slides freely through a rod opening (not illustrated) provided in the valve arm 138 between the pivot point 138a and the valve rod 137. A float 140 is provided on a lower end of the float rod 139. A weight 141 may be provided on the float 140. An adjustable stop 142 is adjustably mounted along the float rod 139. As illustrated in FIG. 9, a latch mechanism 130, biased by a spring force 132 (FIG. 7), is adapted to engage the valve arm 138 when the gate valve 115 is closed.

In operation of the gate valve assembly 136, when the level of water 128 in the pumping chamber 103 is high, as illustrated in FIG. 10, the float rod 139 rides upwardly on the valve arm 138. This releases the valve arm 138 from the latch mechanism 130 and the valve arm 138 pivots upwardly with respect to the pivot point 138a, raising the valve rod 137 and lifting the gate valve 115. Thus, the gate valve 115 disengages the valve seat surfaces 146 (FIG. 5) of the valve seat 144. Consequently, the water 128 is allowed to drain from the pumping chamber 103 and into the transfer conduit 125.

As the level of the water 128 falls in the pumping chamber 103, as illustrated in FIG. 8, the float rod 139 rides downwardly through the rod opening (not illustrated) provided in the valve arm 138 and eventually is suspended from and pulls downwardly on the valve arm 138. The downward force imparted by the weight 141 and float rod 139 pivots the valve arm 138 downwardly about the pivot point 138*a*. This eventually causes the gate valve 115 to drop into place in the valve seat 144 (FIGS. 5 and 6) and engage the valve seat surfaces 146, closing the transfer conduit 125, as illustrated in FIG. 8.

Figure 11:
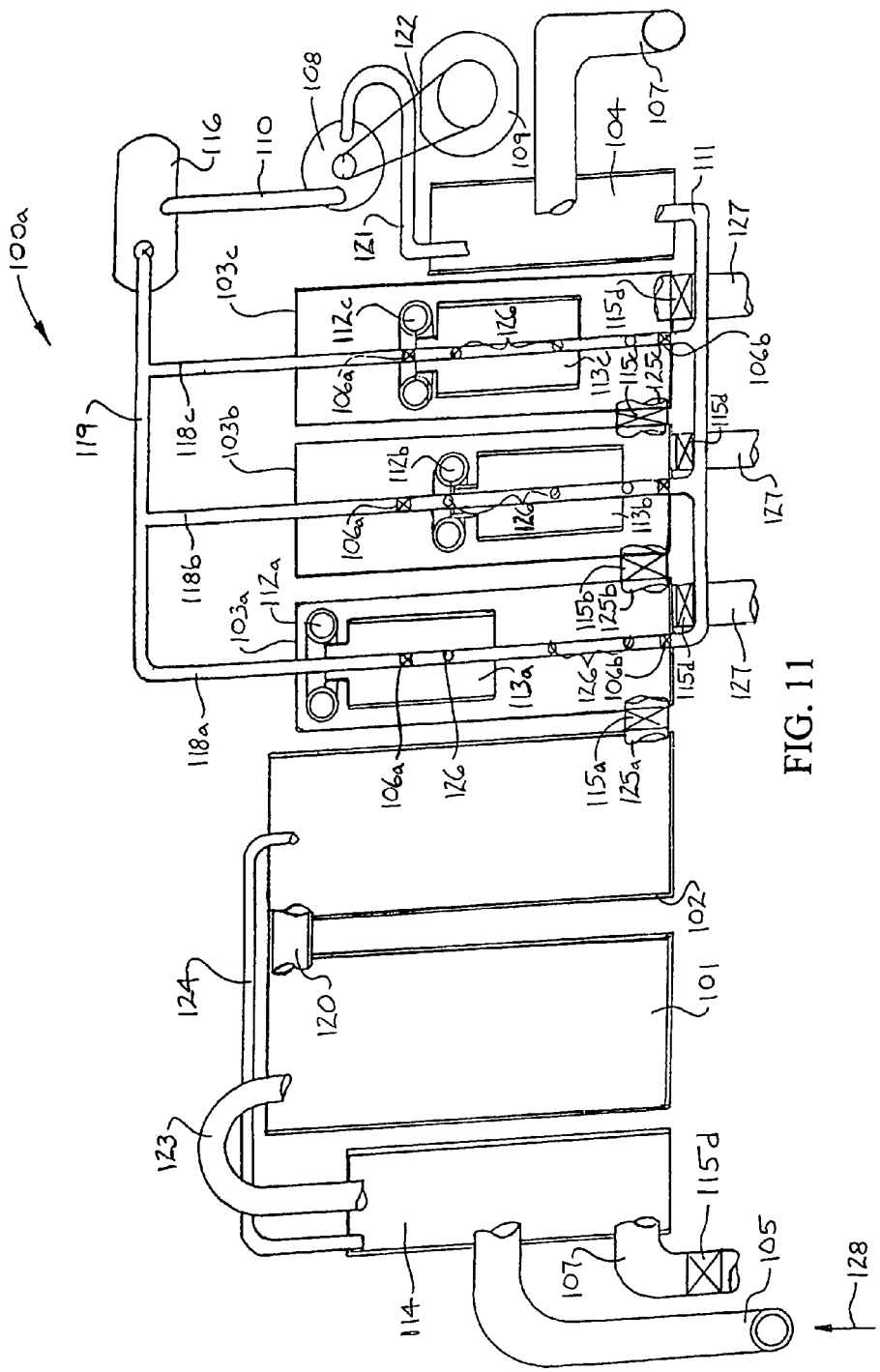
FIG. 11 is a schematic diagram of an alternative illustrative embodiment of a power generation pumping station.

Referring next to FIG. 11 of the drawings, an alternative illustrative embodiment of the power generation pumping system is generally indicated by reference numeral 100*a*. In the pumping system 100*a*, a drain conduit 127, each of which may be fitted with a corresponding gate valve 115*d*, directly connects each pumping chamber 103 back to the pre-filter tank 114 such as through the water return conduit 107. Accordingly, a portion of the water in each pumping chamber 103 can be drained directly from the pumping chamber 103 and distributed back to the pre-filter tank 114 through the corresponding drain conduit 127 by opening of the corresponding gate valve 115*d*. The remaining portion of the water can be distributed from each pumping chamber 103 and into the next pumping chamber 103 through the transfer conduits 125*b* and 125*c* by opening of the gate valves 115*b* and 115*c*, respectively. In some embodiments, each downstream pumping chamber 103 can be located beneath each adjacent upstream pumping chamber 103 such that water from each upstream pumping chamber 103 fills the adjacent downstream pumping chamber 103.

Figure 12:
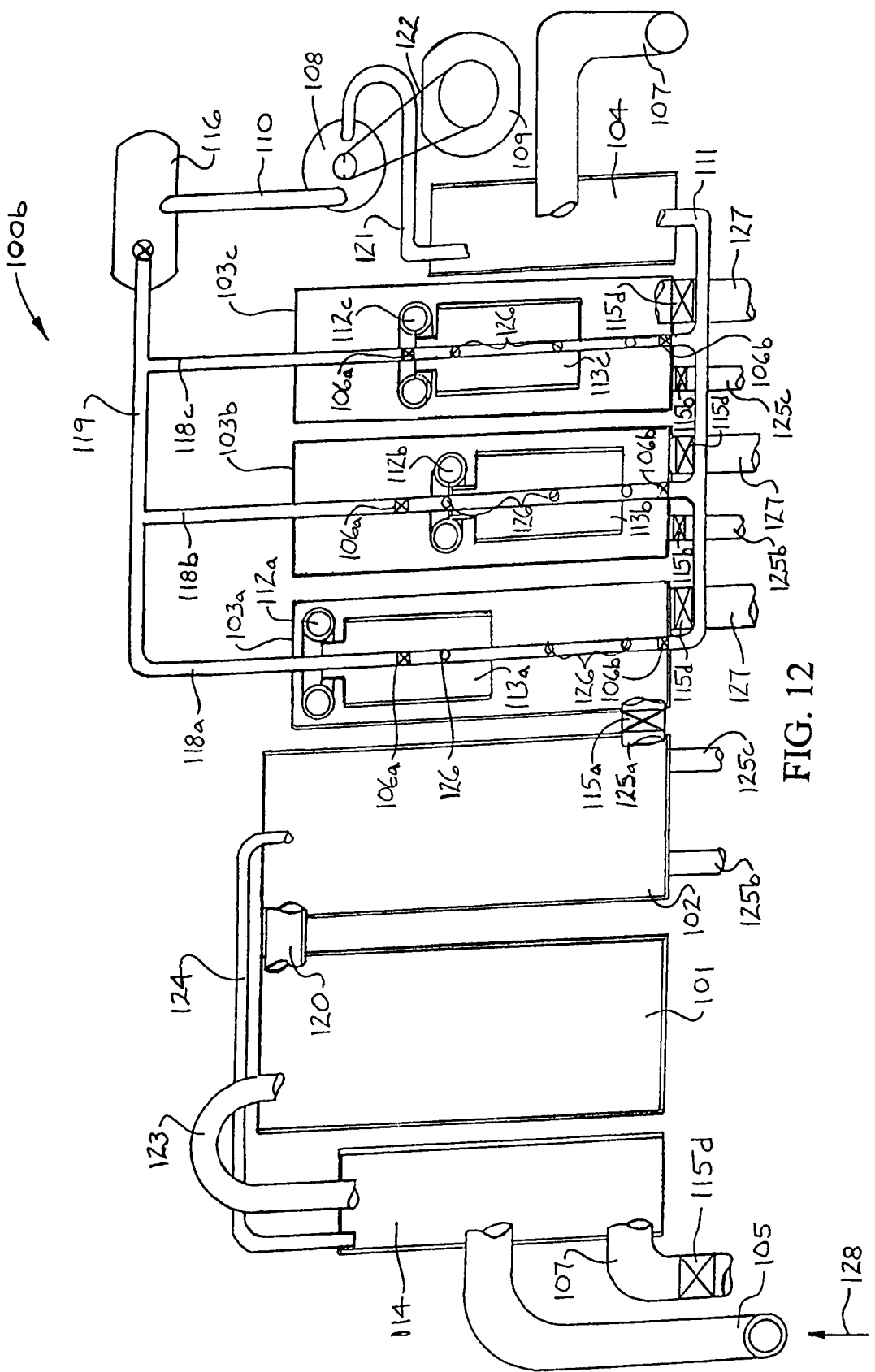
FIG. 12 is a schematic diagram of another alternative illustrative embodiment of a power generation pumping station.

Referring next to FIG. 12 of the drawings, in another alternative illustrative embodiment of the power generation pumping system 100*b*, a drain conduit 127, each of which may be fitted with a corresponding gate valve 115*d*, directly connects each pumping chamber 103 back to the pre-filter tank 114 such as through the water return conduit 107. Additionally, the water storage vault 102 is directly connected to the pumping chambers 103*a*, 103*b* and 103*c* through respective transfer conduits 125*a*, 125*b* and 125*c*. Accordingly, water is transferred directly from the water storage vault 102 to the pumping chamber 103*a* through the transfer conduit 125*a* by opening of the gate valve 115*a*; directly from the water storage vault 102 to the pumping chamber 103*b* through the transfer conduit 125*b* by opening of the gate valve 115*b*; and directly from the water storage vault 102 to the pumping chamber 103*c* through the transfer conduit 125*c* by opening of the gate valve 115*c*. The water in each pumping chamber 103 can be drained directly from the pumping chamber 103 and distributed back to the pre-filter tank 114 through the corresponding drain conduit 127 by opening of the corresponding gate valve 115*d*.

While the preferred embodiments of the disclosure have been described above, it will be recognized and understood that various modifications can be made in the disclosure and the appended claims are intended to cover all such modifications which may fall within the spirit and scope of the disclosure.

We claim:

1. A wave energy conversion system, comprising:
    a barge support frame having a frame superstructure and a plurality of frame support legs selectively extendable from the frame superstructure;
    a barge carried by the barge support frame; and
    a plurality of wave energy conversion pumps each comprising:
        a water transfer conduit carried by the barge support frame and having a filter port;
        a central pump support shaft extending through the water transfer conduit;
        an inner water transfer space defined between the central pump support shaft and the water transfer conduit and disposed in fluid communication with the filter port;
        a pressure conduit mounted for displacement on the water transfer conduit and having an outer barrel, an inner barrel provided in the outer barrel and surrounding the water transfer conduit and an outer water transfer space defined between the inner barrel and the water transfer conduit and disposed in fluid communication with the inner water transfer space;
        an annular ballast space defined between the outer and the inner barrel of the pressure conduit;
        ballast provided in the ballast space; and
        a buoyancy vessel carried by the pressure conduit.

2. The wave energy conversion system of claim 1 further comprising at least one transfer conduit inlet port provided in the water transfer conduit and establishing fluid communication between the inner water transfer space and the outer water transfer space, at least one transfer conduit outlet port provided in the water transfer conduit and establishing fluid communication between the outer water transfer space and the inner water transfer space and a spacer disposed between the central pump support shaft and the water transfer conduit and separating the at least one transfer conduit inlet port and the at least one transfer conduit outlet port.

3. The wave energy conversion system of claim 2 further comprising a first check valve provided in the inner water transfer space in spaced-apart relationship with respect to the filter port.

4. The wave energy conversion system of claim 3 further comprising a second check valve provided in the inner water transfer space between the first check valve and the at least one transfer conduit inlet port.

5. The wave energy conversion system of claim 4 further comprising at least one outlet port provided in the water transfer conduit and disposed in fluid communication with the inner water transfer space, and further comprising a third check valve provided in the inner water transfer space between the at least one transfer conduit outlet port and the at least one outlet port.

6. The wave energy conversion system of claim 5 further comprising reverse osmosis machinery and at least one water filter carried by the barge and disposed in fluid communication with the at least one outlet port of the water transfer conduit.

7. The wave energy conversion system of claim 1 further comprising a first bearing and a second bearing disposed in spaced-apart relationship with respect to each other and receiving the water transfer conduit and wherein the inner barrel and the outer barrel of the pressure conduit extend between the first bearing and the second bearing and the buoyancy vessel is mounted on the first bearing and the second bearing.

* * * * *